Nov. 7, 1961 H. F. NORTON 3,007,532
CULTIVATOR ATTACHMENT FOR LAWN MOWERS
Filed July 28, 1958 2 Sheets-Sheet 1

Harold F. Norton
INVENTOR.

BY *Clarence A. O'Brien*
*and Harvey B. Jackson*
Attorneys

Nov. 7, 1961  H. F. NORTON  3,007,532
CULTIVATOR ATTACHMENT FOR LAWN MOWERS
Filed July 28, 1958  2 Sheets-Sheet 2
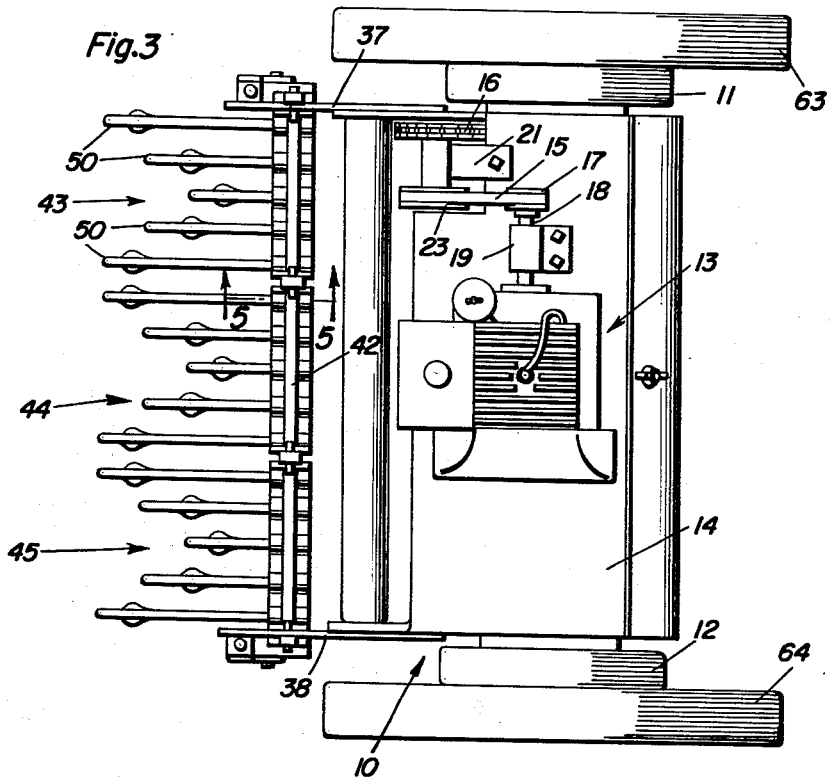
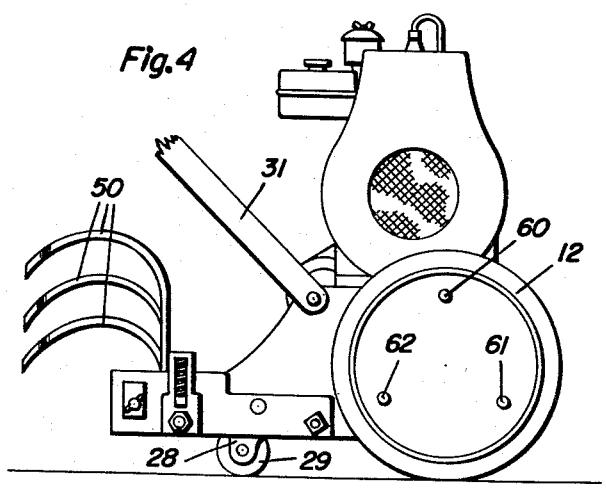
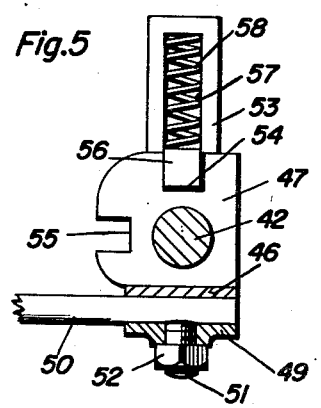
Harold F. Norton
INVENTOR.

United States Patent Office 3,007,532
Patented Nov. 7, 1961

3,007,532
CULTIVATOR ATTACHMENT FOR LAWN MOWERS
Harold F. Norton, Randel Road, Oneida, N.Y.
Filed July 28, 1958, Ser. No. 751,329
5 Claims. (Cl. 172—640)

This invention relates in general to an attachment for a power lawn mower and pertains more particularly to a cultivator attachment for reel type power lawn mowers which is so associated therewith as to be set up for use or which may be swung to an out-of-the-way position so as to permit the lawn mower to operate in the normal and usual manner.

Of primary concern in connection with this invention is the provision of an attachment for power lawn mowers wherein the cultivator instrument itself is more or less permanently attached to the lawn mower frame and in such a manner relative thereto as to be movable either to a downwardly swung position in which the cultivator elements are in operative position or to an upwardly swung position in which the cultivator instruments are out of the way and which will permit the normal operation of the mower in that latter position of the cultivator elements.

Another object of this invention is to provide an assembly for attachment to a lawn mower for rapidly and easily converting the same for use as a power driven cultivator, the assembly including a pair of oversize wheels which are quickly and easily attached to the existing lawn mower wheels so as to elevate the cutting reel assembly thereof and including a plurality of separate and distinct cultivator finger assemblies mounted on the lawn mower frame in such a manner as to be moved between an upstanding out-of-the-way position and a generally horizontally disposed and rearwardly depending operative position.

Still another object of this invention is to provide an attachment of the character described and in accordance with the preceding object wherein the cultivator assemblies are carried by a horizontal mounting shaft member fixed between rearwardly extending frame extensions rigidly affixed to the lawn mower frame and wherein such extensions are provided with vertically slidable supporting wheel members normally spring urged so as to prevent the cultivator assemblies from digging into the ground surface, the spring means being overcome at the will of the operator by depressing the rear of the lawn mower.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a plan view of the assembly shown in FIGURE 1 and further illustrating the disposition of the cultivator assemblies;

FIGURE 4 is a side elevational view of the lawn mower showing the attachment wheels removed therefrom and the cultivator in the out-of-the-way position so as to permit the lawn mower to operate in the normal and usual manner;

FIGURE 5 is an enlarged vertical section taken substantially along the plane of section line 5—5 in FIGURE 3 and illustrating the mounting of the individual cultivator assemblies.

Figure 2:
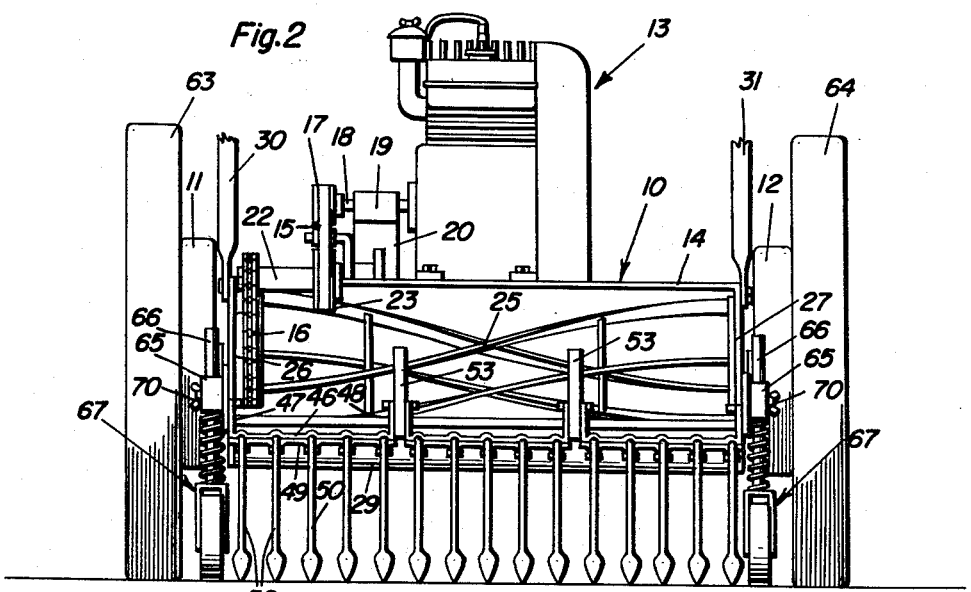
FIGURE 2 is a rear elevational view of the assembly shown in FIGURE 1 illustrating the general arrangement of the cultivator asesmblies and illustrating the relative disposition of component parts thereof.

Referring at this time more particularly to FIGURES 2 and 3, the reference numeral 10 indicates in general a conventional power lawn mower assembly of the reel type including the ground engaging wheels 11 and 12 positively driven by means of the internal combustion engine 13 mounted fixedly on the platform or stand portion 14 forming a portion of the lawn mower frame. Although the details thereof form no part of this invention, the internal combustion engine drives the wheels of the lawn mower by means of a belt 15 and chain 16 as is most clearly shown in FIGURES 2 and 3. The belt 15 is driven from a pulley 17 fixed upon a shaft 18 journaled by means of a sleeve bearing or the like 19 rigidly attached to the platform 14 by means of the upright or stand portion 20 and which shaft is directly coupled to the crank shaft of the internal combustion engine or is a forward extension thereof. A rearwardly extending bracket 21 is rigidly affixed to the platform 14 and terminates in a sleeve bearing 22 journaling a transverse shaft having, at one end thereof, the pulley 23 rigid therewith and at the opposite end a sprocket for driving the chain 16. The chain 16 is also entrained about a sprocket rigid with the shaft driving the reel 25 of the lawn mower and hence, through the usual gear reduction, the conventional wheels 11 and 12 thereof.

Figure 1:
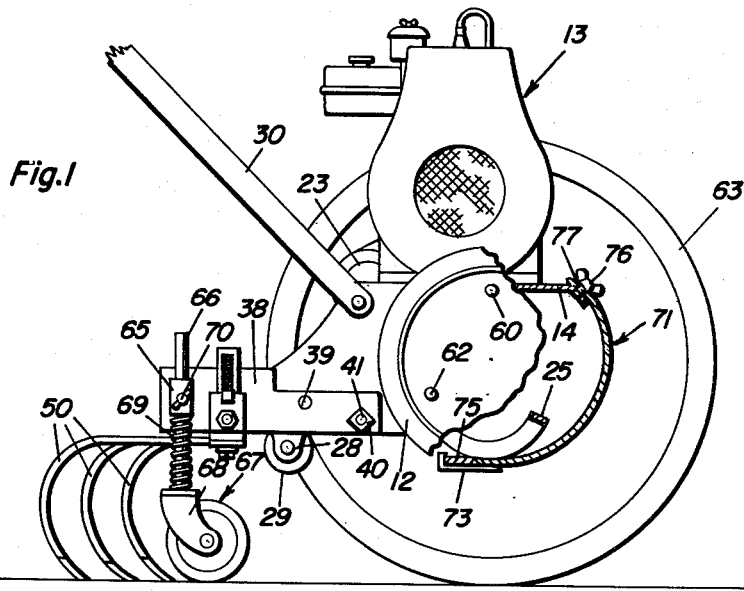
FIGURE 1 is a side elevational view of a lawn mower having the attachment of the present invention mounted thereon, the lawn mower having the near side attachment wheel removed therefrom and being partially broken away to show the details of the mounting for the reel guard member.

In addition to the platform portion 14, the lawn mower frame includes the rearwardly extending side frame elements 26 and 27 having depending bracket ear portions 28, see particularly FIGURE 1, journaling therebetween a roller 29 as is conventional. The lower arms 30 and 31 of a handle assembly are pivotally attached to the side frame members 26 and 27, as is conventional.

For the purpose of providing the cultivator attachment, there are secured to the side frame elements 26 and 27 of the lawn mower frame a pair of side frame extensions 37 and 38, see particularly FIGURE 3, which are rigidly affixed to the corresponding frame side pieces by means of a pin 39 and a nut 40 cooperating with a stud 41 fixed to the lawn mower on each side of the machine. Rigidly affixed between these extension members 37 and 38 is a transverse mounting shaft or bar 42 upon which a plurality of cultivator assemblies indicated generally by the reference characters 43, 44 and 45 are mounted for disposition either in an operative position as is shown in FIGURE 1 or in an inoperative position as is shown in FIGURE 4.

Each cultivator assembly includes a mounting bracket portion of generally U-shaped configurtion having a horizontal bight portion 46 and upstanding legs 47 and 48 at the opposite ends thereof. A lower plate element 49 is removably secured to the bight portion 46 and cooperates therewith to sandwich therebetween a plurality of individual cultivator finger elements 50 disposed in any general pattern but preferably in the length relationship as is most clearly illustrated in FIGURES 3 and 4.

As is shown most clearly in FIGURE 5, the lower member 49 carries a setscrew 51 for each of the cultivator fingers 50 and an associated lock nut 52 serving to rigidly clamp the fingers in operative position and permitting easy replacement thereof. FIGURE 5 further illustrates the manner in which the cultivator assemblies are pivotally attached to the mounting shaft 42 so as to be disposed either in the operative position or inoperative position, as desired and at the will of the operator.

For this purpose, the mounting shaft 42 is provided in longitudinally spaced relationship therealong with a plurality of uprights 53 rigidly secured thereto as by setscrews or the like, and which, it is to be understood, are rigid with the mounting shaft 42. Each of the legs 47 and 48 is notched in the upper edge thereof as indicated by the reference character 54 and in the rear edge thereof as indicated by the reference character 55 to receive a retaining bar 56 carried by the uprights 53, one such bar being provided for each individual upright. Each upright support part 53 is provided with a vertically elongate transverse opening 57 housing a spring member 58 (see particularly FIGURE 5) which normally bears upon the associated bar 56 and urges the same into one or the other of a slot 54 or 55 in the legs 47 and 48. The bars 56 are sufficiently long as to be easily grasped by the fingers and lifted out of engagement with their corresponding notches 54 and 55 to permit the entire associated cultivator sub-assembly to be swung to either of the desired positions corresponding to the notch within which the bar 56 is engaged. When the proper position of the cultivator sub-assemblies is attained, the bar 56 in each case is released to permit the cultivator sub-assembly to be thus held in the associated position to which they were moved.

In order to accommodate the attachment assembly on the conventional lawn mower, each wheel 11 and 12 of the conventional mower is provided with a plurality of outstanding mounting studs 60, 61 and 62, see particularly FIGURE 4, which are adapted to be passed through corresponding openings in oversize wheel elements 63 and 64, the oversize wheel members thus being readily attached or detached in relation to the lawn mower wheels. The purpose of the oversize wheels is to elevate the lawn mower reel 25 a sufficient distance above the ground to positively preclude any interference thereof with flowers, shrubs or the like within which the cultivator assembly may be used. Likewise, the oversize wheels elevate the frame of the assembly such as to permit the cultivator fingers 50 to be disposed in depending operative position as is illustrated in FIGURE 1 and perform their desired cultivating work. Each of the frame extensions 37 and 38 carries a vertical sleeve element 65 rigid therewith and which provides a guide for the upstanding stem 66 of an associated caster wheel indicated generally by the reference character 67. Between the base portion 68 of each such caster wheel and the lower end of the associate sleeve 65, there is provided a compression spring element 69 normally serving to elevate the rear portion of the assembly such that the cultivator fingers 50 just engage or clear the ground surface, thus permitting the lawn mower to be moved from place to place without the fingers 50 digging into the ground surface, but, at the same time, permitting the operator to depress the rear portion of the lawn mower, through the handle assembly, to compress the spring 69 and thus dig the cultivator fingers into the ground. A setscrew 70 is associated with each such sleeve 25 so that the vertical positioning of the caster wheel 67 may be fixed, if desired.

Figure 6:
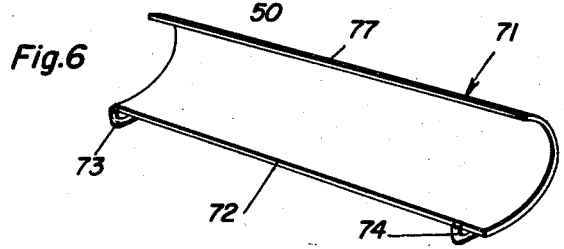
FIGURE 6 is a perspective view of the reel guard.

In addition to the above, it is preferred to provide a guard for the lawn mower reel 25 and, for this purpose, the guard assembly illustrated best in FIGURE 6 and indicated therein by the reference character 71 is provided. The lower rear edge 72 of the guard is provided with rearwardly extending hook members 73 and 74 which, as can be best seen in FIGURE 1, engage under the cutter bar 75 of the conventional lawn mower and extend upwardly at the rear edge thereof so as to affix the guard in position. A screw 76 is associated with the guard to hold it in position and this screw passes through an opening 77 in the guard and into a threaded opening in the stand portion 14 of the lawn mower frame as is best illustrated in FIGURE 1. Thus, the guard is held in position but may be quickly and easily detached from its operative position when desired. By simply removing the wheels 63 and 64 and the caster wheels 67, and then swinging all of the cultivator assemblies to the inoperative position as is shown in FIGURE 4, the lawn mower may be operated in the usual and conventional manner without interference from any portion of the attachment assembly. On the other hand, by simply positioning the wheels 63 and 64 in place relative to the machine and then swinging the desired cultivator sub-assembly downwardly to the operative position and utilizing the caster wheels 67, the lawn mower is quickly and easily converted to a cultivator attachment.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A cultivator attachment for lawn mowers comprising a pair of frame extensions adapted to be attached in rearwardly projecting position upon an associated lawn mower, a mounting shaft rigidly affixed between said extensions, a plurality of cultivator assemblies pivotally carried by said mounting shaft, and means for adjustably fixing said cultivator assemblies in operative and inoperative position on said mounting shaft, said means including a plurality of parts fixed to said mounting shaft, and a bar resiliently carried by each such part engaging and frictionally holding an associated cultivator assembly, each cultivator assembly including a horizontal bight portion, an upstanding leg fixed to each bight portion at each end thereof, said legs having aligned apertures for pivotally receiving said mounting shaft, each of said legs being provided with a pair of angularly related notches for selectively receiving said bars, a first of said pair of notches corresponding to an inoperative cultivator assembly position and a second of said pair of notches corresponding to an operative cultivator assembly position.

2. A cultivator attachment for lawn mowers comprising a pair of frame extensions adapted to be attached in rearwardly projecting position upon an associated lawn mower, a mounting shaft rigidly affixed between said extensions, a plurality of cultivator assemblies pivotally carried by said mounting shaft, and means for adjustably fixing said cultivator assemblies in operative and inoperative position on said mounting shaft, said means including a plurality of parts fixed to said mounting shaft, and a bar resiliently carried by each such part engaging and frictionally holding an associated cultivator assembly, each cultivator assembly including a horizontal bight portion, an upstanding leg fixed to each bight portion at each end thereof, said legs having aligned apertures for pivotally receiving said mounting shaft, each of said legs being provided with a pair of angularly related notches for selectively receiving said bars, a first of said pair of notches corresponding to an inoperative cultivator assembly position and a second of said pair of notches corresponding to an operative cultivator assembly position, each extension having a vertical sleeve fixed thereto, and a caster wheel associated with each such sleeve including a vertical stem slidably received in the sleeve, there being a compression spring surrounding each stem below the associated sleeve normally elevating the rear of the associated lawn mower.

3. In a cultivator attachment for lawn mowers, the combination of a pair of transversely spaced frame members adapted to be attached to a lawn mower, a transverse shaft extending between and rigid with said frame members, a plurality of cultivator assemblies pivotally mounted on said shaft for raising and lowering movement independently of one another, a set of supports secured to said shaft between adjacent cultivator assemblies, and a spring-pressed keeper bar slidable in each of said supports toward and away from said shaft and projecting to both sides of the associated support, portions of said cultivator assemblies adjacent each support being provided each with a pair of notches selectively receiving the keeper bar of the adjacent support, said notches being spaced angularly relative to said shaft with one notch in each pair corresponding to the raised position and the other notch to the lowered position of the associated cultivator assembly, whereby the keeper bar of each support may selectively lock two adjacent cultivator assemblies in their raised and lowered positions.

4. The device as defined in claim 3 wherein each of said cultivator assemblies includes a transversely elongated U-shaped member having an elongated bight portion and a pair of apertured legs provided at the ends of said bight portion and pivotally mounted on said shaft between said supports, said legs having said pairs of notches provided therein.

5. The device as defined in claim 4 wherein each of said cultivator assemblies also includes a plurality of transversely spaced cultivator members carried by the bight portion of said U-shaped member, and means individually removably securing said cultivator members to said bight portion.

References Cited in the file of this patent

UNITED STATES PATENTS

| | | |
|---|---|---|
| 667,733 | Patman | Feb. 12, 1901 |
| 1,284,122 | Maillet | Nov. 5, 1918 |
| 1,965,495 | Grist | July 3, 1934 |
| 2,036,911 | Barrentine et al. | Apr. 7, 1936 |
| 2,091,427 | Brodersen | Aug. 31, 1937 |
| 2,231,821 | Sprouse | Feb. 11, 1941 |
| 2,572,202 | Rowland | Oct. 23, 1951 |
| 2,677,927 | Aubrey | May 11, 1954 |

FOREIGN PATENTS

| | | |
|---|---|---|
| 512,817 | France | Oct. 23, 1920 |